United States Patent
Schwarz (10) Patent No.: US 10,435,183 B1
(45) Date of Patent: Oct. 8, 2019

(54) DEPLOYABLE PROPULSION MODULE FOR SPACECRAFT

(71) Applicant: Space Systems/Loral, LLC, Palo Alto, CA (US)

(72) Inventor: Robert Erik Schwarz, Redwood Estates, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 364 days.

(21) Appl. No.: 15/488,179

(22) Filed: Apr. 14, 2017

(51) Int. Cl.
*B64G 1/22* (2006.01)
*B64G 4/00* (2006.01)
*B64G 1/40* (2006.01)

(52) U.S. Cl.
CPC ............... *B64G 1/222* (2013.01); *B64G 1/40* (2013.01); *B64G 4/00* (2013.01); *B64G 2004/005* (2013.01); *Y10S 901/15* (2013.01); *Y10S 901/28* (2013.01)

(58) Field of Classification Search
CPC . B64G 1/222; B64G 1/40; B64G 1/64; B64G 1/242; B64G 2004/005
See application file for complete search history.

(56) References Cited

U.S. PATENT DOCUMENTS

| | | | |
|---|---|---|---|
| 5,595,360 A | 1/1997 | Spitzer | |
| 5,810,295 A | 9/1998 | Anzel | |
| 5,813,043 A | 9/1998 | Iles et al. | |
| 6,032,904 A | 3/2000 | Hosick et al. | |
| 6,116,543 A | 9/2000 | Koppel | |
| 6,543,723 B1 | 4/2003 | Oh | |
| 6,565,043 B1 | 5/2003 | Wittmann | |
| 7,059,571 B2 | 6/2006 | Kellberg | |
| 7,113,851 B1 | 9/2006 | Gelon | |
| 8,763,957 B1 | 7/2014 | Higham | |
| 9,108,748 B2 | 8/2015 | Munir et al. | |
| 9,108,749 B2 | 8/2015 | Woo et al. | |
| 10,053,240 B1 * | 8/2018 | Helmer | B64G 1/222 |
| 2015/0001345 A1 | 1/2015 | Polle | |
| 2016/0114908 A1 | 4/2016 | Knirsch et al. | |
| 2018/0093786 A1 * | 4/2018 | Schwarz | B64G 1/10 |

FOREIGN PATENT DOCUMENTS

WO  WO 2015/138592  9/2015

* cited by examiner

*Primary Examiner* — Philip J Bonzell
*Assistant Examiner* — Tye William Abell
(74) *Attorney, Agent, or Firm* — Weaver Austin Villeneuve & Sampson LLP (57) ABSTRACT

A spacecraft includes at least one deployable propulsion module, the propulsion module including at least one thruster fixedly disposed with respect to the propulsion module, a first arrangement for coupling the propulsion module to a first portion of the spacecraft in a first configuration and a second arrangement for coupling the propulsion module to a second portion of the spacecraft in a second configuration. The spacecraft is reconfigurable, on-orbit, from the first configuration to the second configuration. In the first configuration, the deployable propulsion module is detached from the second arrangement and the at least one thruster is oriented to produce thrust in a first direction. In the second configuration, the deployable propulsion module is detached from the first arrangement and the at least one thruster is oriented to produce thrust in a second direction, the second direction being substantially different from the first direction.

18 Claims, 9 Drawing Sheets

Detail J

Detail K

DEPLOYABLE PROPULSION MODULE FOR SPACECRAFT

TECHNICAL FIELD

This invention relates generally to communications satellites, and more particularly to robotically assisted assembly and reconfiguration of a spacecraft including a deployable propulsion module.

BACKGROUND

The assignee of the present invention manufactures and deploys spacecraft for, inter alia, communications and broadcast services.

Such spacecraft are equipped with on board propulsion systems, including chemical or electric thrusters, for orbit raising from a launch vehicle transfer orbit (or "parking orbit") to an operational orbit, for example, to a geosynchronous orbit; for stationkeeping once disposed in the operational orbit; and for attitude control/momentum management purposes.

Some known art related to such satellite propulsion systems include U.S. Pat. Nos. 8,763,957, 7,113,851, 6,543,723, 9,108,748, and 9,108,749, all assigned to the assignee of the present invention.

The propulsion mission functions contemplated by the present application, include, but are not limited to, momentum management and orbit control, orbit control including orbit raising, orbit lowering and stationkeeping (N-S and E-W) for geosynchronous and other Earth orbiting spacecraft. Typical requirements for such propulsion mission functions are described in detail in U.S. Pat. No. 6,032,904, assigned to the assignee of the present invention, and may be summarized as follows.

Orbit raising functions relate to the task of transferring a spacecraft from an initial lower orbit (into which the spacecraft has been injected by a launch vehicle) to, for example, an intermediate orbit or an operational orbit or from an operational orbit to a graveyard orbit. Where a liquid chemical thruster is the propulsion technology chosen for performing the orbit raising function, the mass of the chemical propellant needed for orbit raising can be as much as half of the spacecraft total mass injected into the initial orbit by the launch vehicle. Where an electric thruster system is used for part or all of the orbit raising function, a substantial mass savings may be achieved, by virtue of the electric thruster's higher specific impulse (Isp) however, significantly more time must be allocated to the orbit raising phase of the spacecraft's life, as a result of the electric thruster's lower thrust. Orbit lowering functions relate to the task of transferring a spacecraft from an initial higher orbit to a lower orbit.

Once in an operational orbit, the propulsion system is responsible for maintaining correct orbital position and attitude throughout the life of the spacecraft. For a geostationary spacecraft, for example, the correct orbital position always lies in the plane of the earth's equator, at a particular assigned longitude. Various forces act on the spacecraft which, in the absence of propulsion stationkeeping functions, tend to move the spacecraft out of the desired orbital position. These forces arise from several sources including the gravitational effects of the sun and moon, the elliptical shape of the earth, and solar radiation pressure. Stationkeeping includes control of the inclination, eccentricity, and drift of the spacecraft. The orbit's inclination relates to the north-south position of the spacecraft relative to the earth's equator and may be maintained at a value acceptably close to zero by performing periodic north-south stationkeeping (NSSK) maneuvers. Drift is a measure of the difference in longitude of the spacecraft's sub satellite point and the desired geostationary longitude as time progresses and may be corrected by performing periodic east-west stationkeeping (EWSK) maneuvers. Eccentricity is a measure of the noncircularity of the spacecraft orbit, and may be controlled in the course of performing NSSK and/or EWSK maneuvers, or separately.

Once on-station, a spacecraft must maintain its attitude in addition to its orbital position. Disturbance torques, such as solar pressure, work to produce undesired spacecraft attitude drift. Momentum wheel stabilization systems are commonly used to counteract such disturbance torques. Such systems typically include one or more momentum wheels and control loops to sense and control changes in the spacecraft attitude. The control loops determine the required speed of the wheels to absorb or off-load momentum based on a sensed spacecraft attitude. Momentum stored in the momentum wheels must be periodically unloaded, to keep the momentum wheels within a finite operable speed range. Momentum wheel unloading is typically accomplished by applying an external torque to the spacecraft by firing a thruster, a propulsion mission function referred to herein as momentum management.

Electric propulsion is being used with increased frequency for both orbit raising and orbital stationkeeping. For many final orbits, including particularly geosynchronous orbits, orbit raising and NSSK maneuvers are the dominant propulsion activity. Efficiency of a NSSK maneuver by aligning the thrust vector to provide that at least a substantial component of the thrust vector is in the orbit normal direction, i.e., parallel to the axis of rotation of the solar arrays, which must counter orbital rotation to maintain the arrays in a sun-oriented attitude.

During orbit raising, however, the satellite must be steered along a non-fixed attitude trajectory to optimize the use of propellant and minimize orbit raising time of flight. In order to keep the solar arrays in a sun-oriented attitude during orbit raising, a combination of rotation of the satellite about the thrust vector and rotation of the arrays around their rotational axis simultaneously maintains sun tracking and thrust vector tracking. Thus, orbit raising generally requires the thrust vector to be at least approximately orthogonal to the axis of rotation of the solar arrays.

In the absence of the presently disclosed techniques, the competing requirements to produce thrust orthogonal to the solar array rotational axis during orbit raising and parallel to the rotational axis during NSSK have been met by providing additional thrusters and/or complex actuators to reposition a thruster.

SUMMARY

According to some implementations, a spacecraft includes at least one deployable propulsion module, the propulsion module including at least one thruster fixedly disposed with respect to the propulsion module. The spacecraft includes a first arrangement for coupling the propulsion module to a first portion of the spacecraft in a first configuration and a second arrangement for coupling the propulsion module to a second portion of the spacecraft in a second configuration. The spacecraft is reconfigurable, on-orbit, from the first configuration to the second configuration. In the first configuration, the deployable propulsion module is detached from the second arrangement and the at least one thruster is oriented to produce thrust in a first direction. In the second configuration, the deployable propulsion module is detached from the first arrangement and the at least one thruster is oriented to produce thrust in a second direction, the second direction being substantially different from the first direction.

In some examples, in a transition configuration, intermediate to the first configuration and the second configuration, the deployable propulsion module may be detached from both the first arrangement and the second arrangement. In some examples, in the transition configuration, the deployable propulsion module may be coupled with the spacecraft only by way of a mechanical linkage, the mechanical linkage including a manipulator. In some examples, the manipulator may be a self-relocatable robotic arm, the robotic arm including at least two end effectors, and a plurality of articulable joints disposed between the at least two end effectors. In some examples, the manipulator may be operable to reconfigure the spacecraft from the first configuration, through the transition configuration, to the second configuration.

In some examples, the spacecraft may includes a solar array rotatable about a solar array rotational axis, the first direction may be approximately orthogonal to the solar array rotational axis, and the second direction may have a substantial component parallel to the solar array rotational axis. In some examples, the second direction may be approximately parallel to the solar array rotational axis.

In some examples, the spacecraft may include a plurality of deployable module elements, the spacecraft being reconfigurable from a launch configuration to either of the first configuration and second configuration. In the launch configuration, the deployable module elements may be disposed in a launch vehicle in a stacked configuration. In the first configuration and second configuration, the deployable module elements may be disposed in a side by side configuration. In some examples, at least one of the deployable module elements may be a persistent bus services module and at least one of the deployable module elements is a replaceable payload module.

In some examples, at least one of the first arrangement and the second arrangement may include an electrical coupling between the deployable propulsion module and one or both of the first portion of the spacecraft and the second portion of the spacecraft.

According to some implementations, a method includes reconfiguring an orbiting spacecraft from a first configuration to a second configuration. The spacecraft includes a deployable propulsion module including at least one thruster, a first arrangement for coupling the propulsion module to a first potion of the spacecraft in the first configuration and a second arrangement for coupling the propulsion module to a second portion of the spacecraft in the second configuration. In the first configuration, the deployable propulsion module is detached from the second arrangement and the at least one thruster is oriented to produce thrust in a first direction. In the second configuration, the deployable propulsion module is detached from the first arrangement and the at least one thruster is oriented to produce thrust in a second direction, the second direction being substantially different from the first direction. Reconfiguring the orbiting spacecraft includes detaching the deployable propulsion module from the first arrangement and attaching the deployable propulsion module to the second arrangement.

In some examples, in a transition configuration, intermediate to the first configuration and the second configuration, the deployable propulsion module may be detached from both the first arrangement and the second arrangement. In some examples, in the transition configuration, the deployable propulsion module may be coupled with the spacecraft only by way of a mechanical linkage, the mechanical linkage including a manipulator. In some examples, the manipulator may be a self-relocatable robotic arm, the robotic arm including at least two end effectors, and a plurality of articulable joints disposed between the at least two end effectors. In some examples, the manipulator may be operable to reconfigure the spacecraft from the first configuration, through the transition configuration, to the second configuration.

In some examples, the spacecraft may include a solar array rotatable about a solar array rotational axis, the first direction may be approximately orthogonal to the solar array rotational axis, and the second direction may have a substantial component parallel to the solar array rotational axis. In some examples, the second direction may be approximately parallel to the solar array rotational axis.

In some examples, the spacecraft may include a plurality of deployable module elements, the spacecraft being reconfigurable from a launch configuration to either of the first configuration and second configuration. In the launch configuration, the deployable module elements may be disposed in a launch vehicle in a stacked configuration. In the first configuration and second configuration, the deployable module elements may be disposed in a side by side configuration. In some examples, at least one of the deployable module elements may be a persistent bus services module and at least one of the deployable module elements may be a replaceable payload module.

In some examples, at least one of the first arrangement and the second arrangement may include an electrical coupling between the main body module and the deployable propulsion module.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening e feature s may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The presently disclosed techniques contemplate a spacecraft having a deployable propulsion module that includes at least one thruster, each thruster having an orientation that is fixed relative to the propulsion module. The deployable propulsion module may be detachably coupled with the remainder of the spacecraft and may include at least one electric thruster. An electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a heavy noble gas such as xenon or argon, for example. Irrespective of the selected propellant, a negligible amount of thrust results from energy chemically stored in the propellant. The term electric thruster, as used herein and in the claims, encompasses an electrostatic thruster, an electromagnetic thruster, a Hall Effect thruster, a wakefield accelerator, and a traveling wave accelerator, for example.

The deployable propulsion module may also include propellant storage and management devices and thruster power conditioning electronics. The spacecraft may be configured to include a number of attachment interfaces for the propulsion module which include provisions for mechanical coupling of the propulsion module with the remainder of the spacecraft as well as electrical couplings with spacecraft power equipment such as batteries and solar arrays. The attachment interfaces may also provide a telemetry and command interface. Alternatively, or in addition, some or all telemetry and command functions may be provided using a wireless technology.

The deployable propulsion module may be re-positioned from a first arrangement of attachment interfaces to a second, different, arrangement of attachment interfaces so as to optimize the orientation of the thruster for each specific mission phase. As a result, complicated mechanisms associated with gimbaled propulsion systems may be avoided. In some implementations, the spacecraft includes a robotic manipulator operable to reconfigure the spacecraft by re-positioning the propulsion module from the first arrangement of attachment interfaces to the second arrangement of attachment interfaces.

Figure 1:
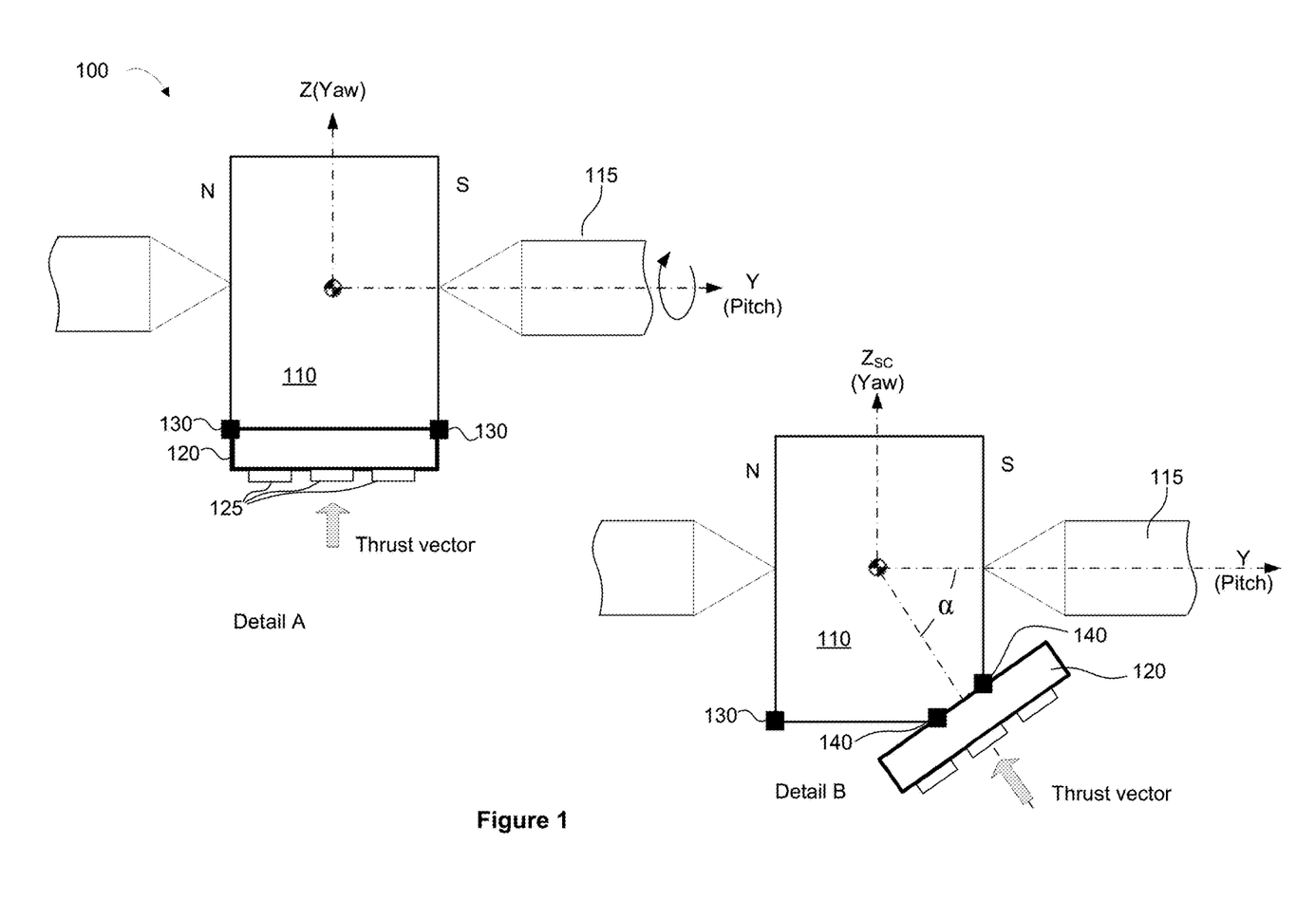
FIG. 1 illustrates an example of a spacecraft according to an implementation.

FIG. 1 illustrates a spacecraft according to an implementation. The spacecraft 100 includes a main body module 110 and a deployable propulsion module 120. The deployable propulsion module 120 includes a number of thrusters 125. The thrusters 125 may be fixedly disposed on the deployable propulsion module 120. That is, the thrusters 125 may be mechanically coupled with the propulsion module 120 while avoiding the use of gimbals or other actuators. In the illustrated implementation, three thrusters 125 are shown but a greater or smaller number of thrusters may be contemplated. Advantageously the thrusters 125 may be low thrust, high specific impulse electric thrusters. The deployable propulsion module 120 may be detachably coupled with the main body module 110 by way of a first arrangement that includes at least one attach interface 130. In the illustrated implementation, the deployable propulsion module 120 is detachably coupled with the main body module 110 by way of two attachment interfaces 130. The main body module 110 is coupled with at least one solar array 115. The solar array 115 may be configured to be rotated about a rotational axis that is parallel to or (as illustrated) approximately co-aligned with the spacecraft pitch axis. Referring to Detail A, it may be observed that, in the illustrated first configuration, thrusters 125 develop a thrust vector that is substantially orthogonal to the rotational axis of the solar array 115.

Referring to Detail B of FIG. 1, it may be observed that the spacecraft 100 has been reconfigured such that the deployable propulsion module 120 is detached from the first arrangement (of attachment interfaces 130), and is now oriented to such that the thrusters 125 develop a thrust vector in a direction that is substantially non-orthogonal to the rotational axis of the solar array 115. In the illustrated second configuration of Detail B, the deployable propulsion module 120 is detachably coupled with the main body module 110 by way of a second arrangement that includes at least one attachment interface 140, such that the thrusters 125 develop a thrust vector that has a substantial component parallel to the solar array rotational axis. For example, angle α may, advantageously, be less than about 45°.

In some implementations, the main body module may include a robotic manipulator (not illustrated) that is configured to grapple with and reposition the deployable propulsion module 120. As such, there may be a transition configuration, intermediate to the first configuration and the second configuration in which the deployable propulsion module is detached from both the first arrangement of attach interfaces 130 and the second arrangement of attach interfaces 140.

It is contemplated that the first arrangement of attachment interfaces 130 and the second arrangement of attachment interfaces 140 may provide not only for mechanical coupling between the main body 110 and the deployable propulsion module 120, but also for an electrical power coupling. In some implementations, the attachment interfaces 130 and the second arrangement of attach interfaces 140 may provide for a telemetry and command interface between the main body 110 and the deployable module 120.

Figure 2:
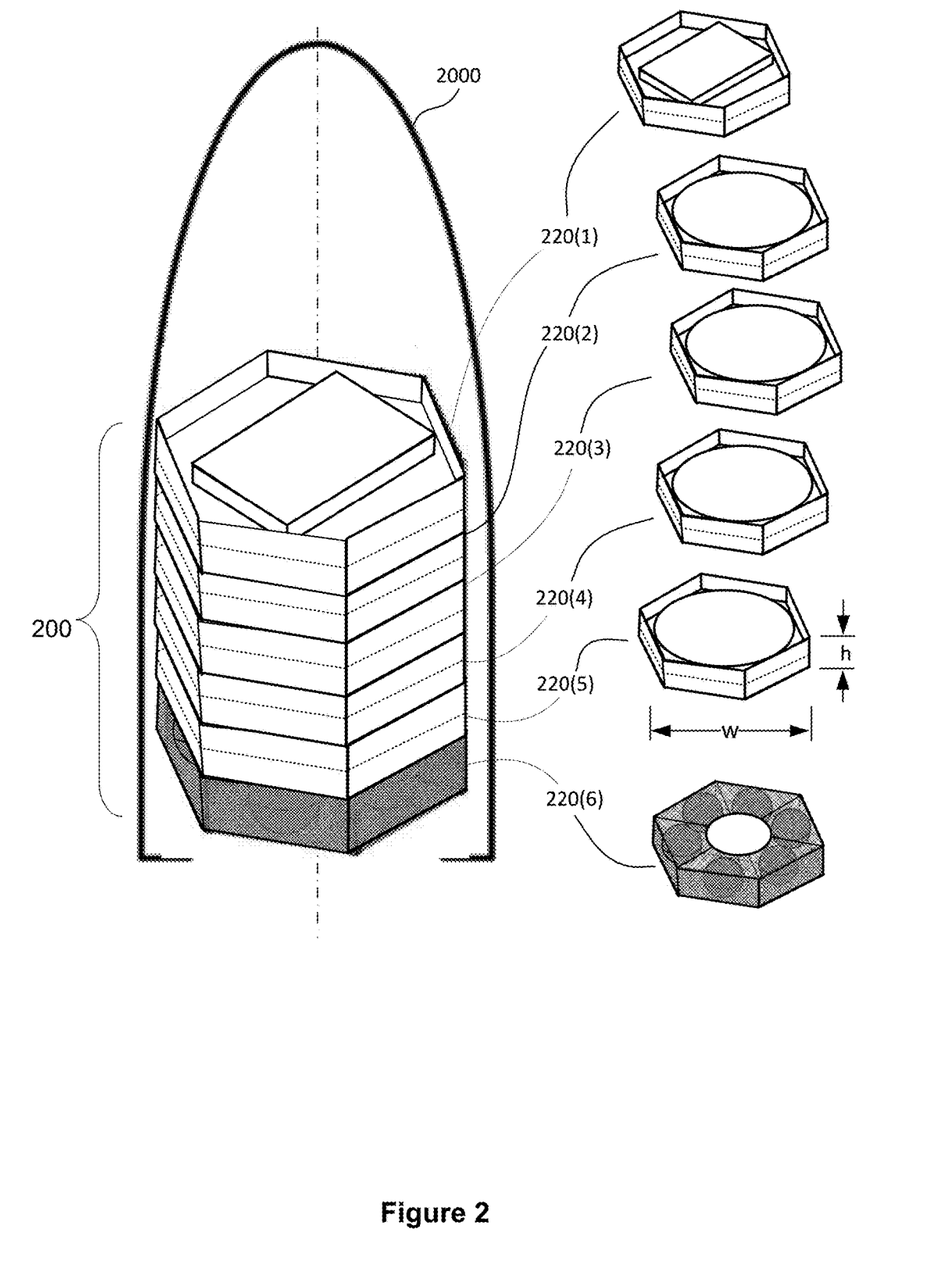
FIG. 2 illustrates an example of a spacecraft according to another implementation.

In some implementations, a spacecraft may be configured as a self-assembling arrangement of deployable modules elements. Referring to FIG. 2, the spacecraft 200, illustrated in a launch configuration as being enclosed by a launch vehicle fairing 2000, includes six deployable module elements 220. In the illustrated implementation, the deployable module element 220(1) may be configured as a bus service module, each of the deployable module elements 220(2), 220(3), 220(4) and 220(5) may be configured as a respective payload module, and the deployable module element 220(6) may be configured as a propulsion module. In some implementations, the deployable module elements 220(1) may be configured as a persistent bus services module and at least one of the deployable module elements 220(2), 220(3), 220(4) and 220(5) is a replaceable payload module.

In the illustrated implementation, the deployable modules have a similar form factor where a height 'h' is small relative to a width 'w'. For example, in the illustrated implementation, 'h' may be approximately one meter and 'w' may be selected to maximize utilization of the launch vehicle fairing diameter, which may be approximately 4-5 meters. In the illustrated implementation, the deployable module elements have six edge faces, but a greater or smaller number of edge faces may be contemplated. In some implementations, the deployable module elements may have a circular form factor.

Figure 3:
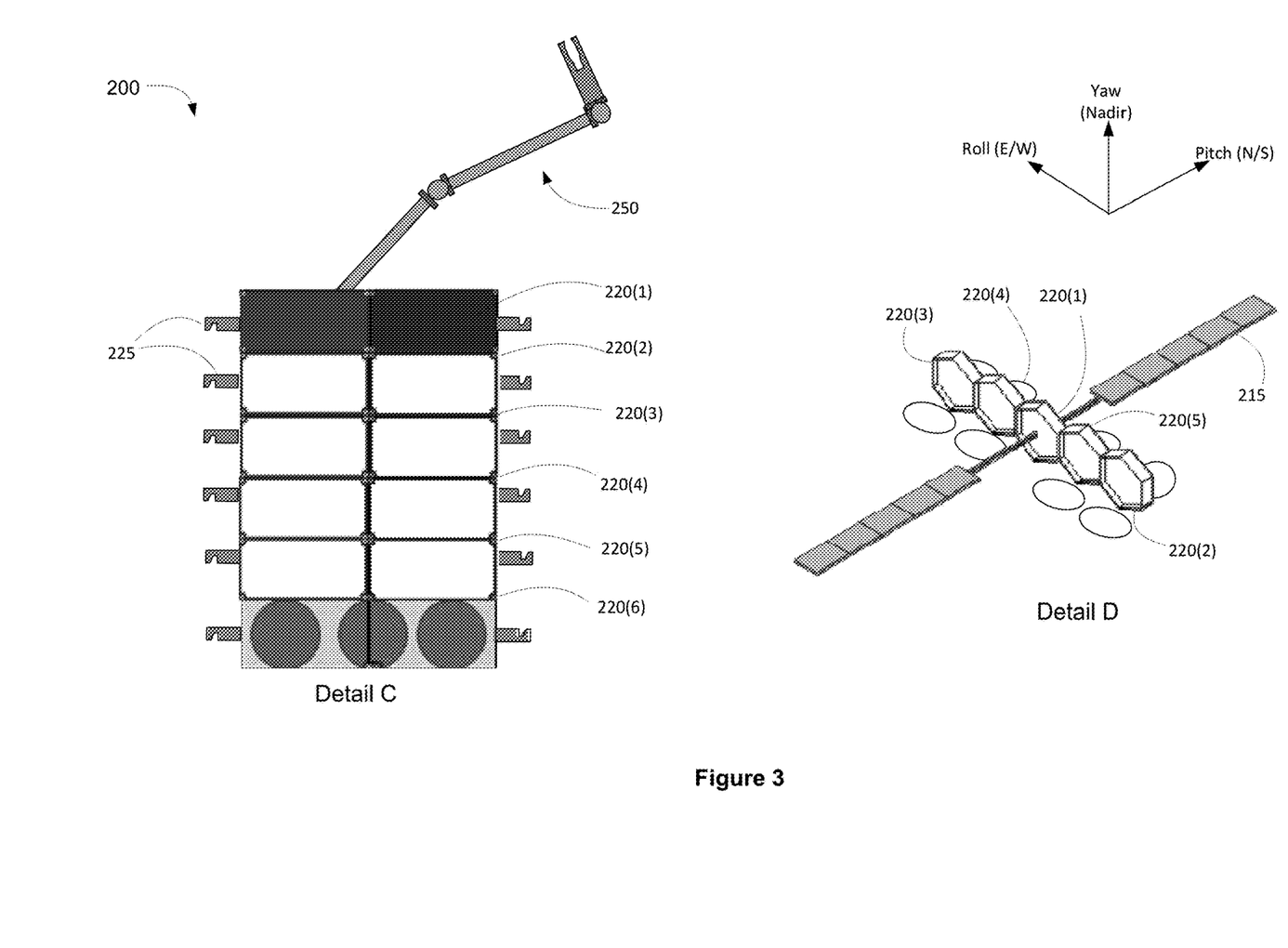
FIG. 3 illustrates an example of the spacecraft in a launch configuration and in an on-orbit configuration according to an implementation.

Referring now to FIG. 3, the spacecraft 200 may include a manipulator 350 that is operable to reconfigure the spacecraft on orbit from a launch configuration to an on-orbit configuration, where, in the launch configuration (FIG. 2 and Detail C of FIG. 3), the deployable module elements 220 are disposed in a stacked configuration and, in the on-orbit configuration (Detail D of FIG. 3), the deployable module elements 220 are disposed in a side by side configuration.

The manipulator 250 may be or include a self-relocatable robotic arm, the robotic arm including at least two end effectors, and a plurality of articulable joints disposed between the at least two end effectors. In some implementations, the robotic manipulator may include a robotic arm having two end effectors and several articulable joints disposed therebetween. Each deployable module element 220 may include at least one grappling fixture 225. Some or all of the grappling fixtures 225 may provide an electrical power and/or telemetry/command interface between the manipulator 250 and an associated module element 220, in addition to a mechanical coupling between the associated module element 220 and the manipulator 250. The mechanical coupling, advantageously, may be engaged, disengaged, and reengaged any number of times.

Figure 4:
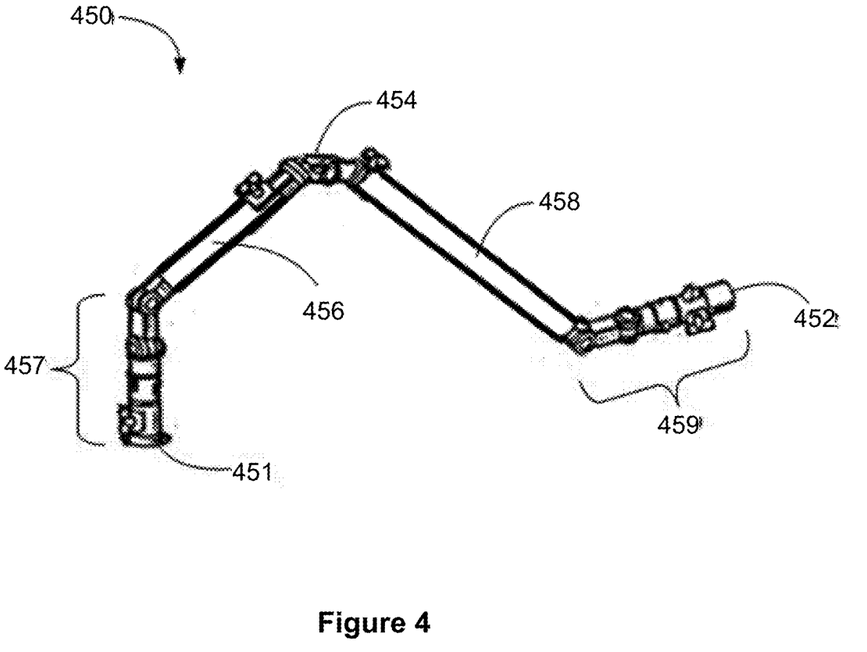
FIG. 4 illustrates an example of a multipurpose manipulator, according to an implementation.

For example, referring now to FIG. 4, an example of a multipurpose manipulator will be described. Manipulator 450 includes first and second longitudinally elongated arms 456 and 458. Respective proximal ends of the arms 456 and 458 may be coupled together by means of an elbow joint 454. Articulator 457 including one or more articulable joints may be coupled with a distal end of arm 456. Similarly, articulator 459 may be coupled with a distal end of arm 458. In some implementations one or both of the articulator 457 and the articulator 459 includes a pitch joint, a yaw joint, and a roll joint. First and second end effectors 451 and 452 may be mounted at the respective distal ends of the articulators 457 and 459.

Figure 5A:
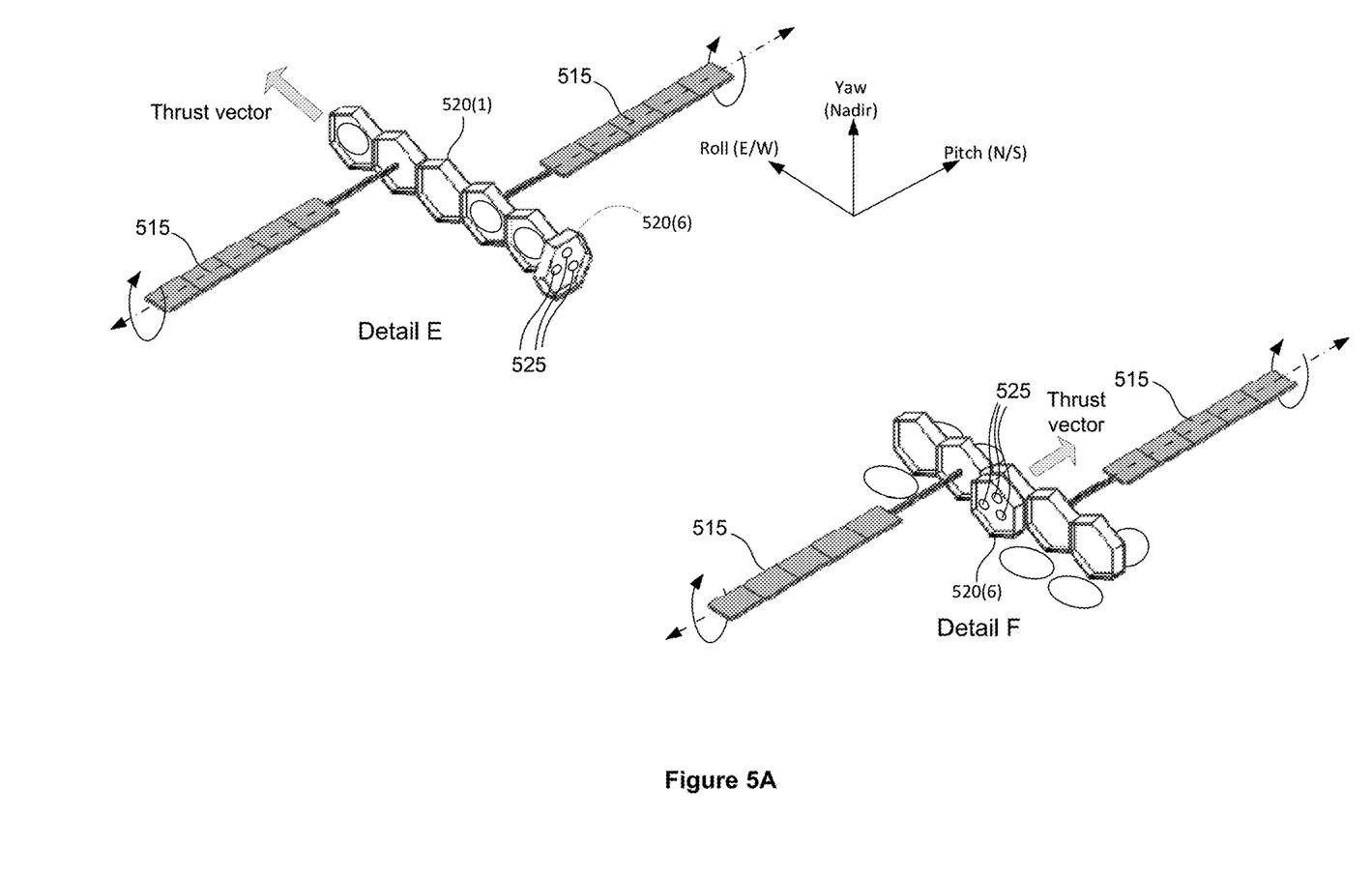
FIG. 5A illustrates a spacecraft in a first on-orbit configuration and a second on orbit configuration, according to an implementation.

FIG. 5A illustrates a spacecraft 500 in a first on-orbit configuration (Detail E) and a second on orbit configuration (Detail F). In the first on orbit configuration, it may be observed that a deployable propulsion module 520(6) is configured such that thrusters 525 disposed thereon may produce thrust in a direction ("thrust vector") that is approximately aligned with the roll axis and substantially orthogonal to the rotational axes of solar arrays 515. Referring to Detail F, in the second on orbit configuration, it may be observed that the deployable propulsion module 520(6) is configured such that thrusters disposed thereon may develop a thrust vector that is substantially parallel to the rotational axes of solar arrays 515. The first on orbit configuration may be advantageous for orbit raising maneuvers, whereas the second on-orbit configuration may be advantageous for NSSK.

Figure 5B:
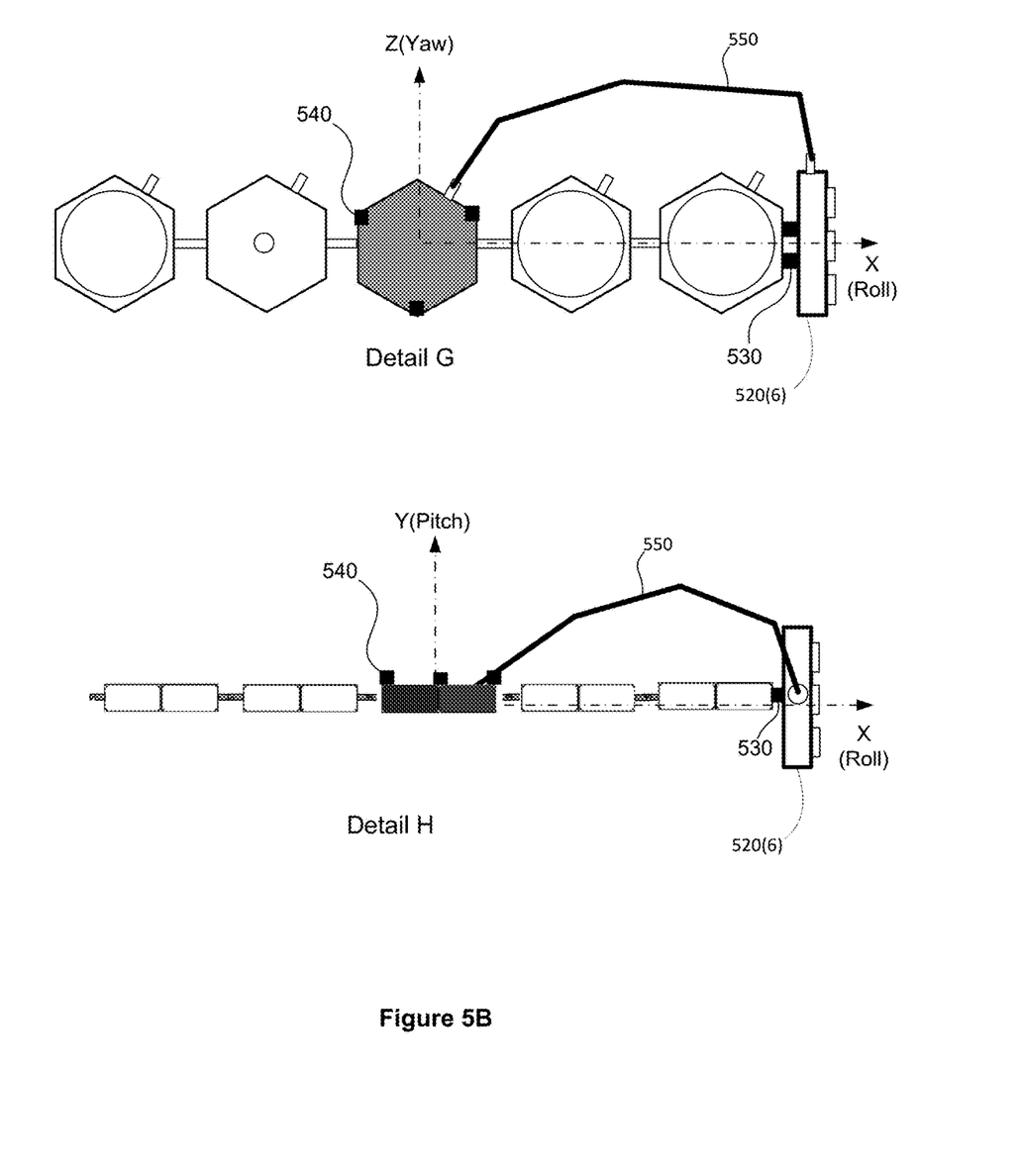
FIGS. 5B through 5D illustrate techniques by which the satellite may be reconfigured from the first on-orbit configuration to the second on-orbit configuration, according to an implementation.
Figure 5C:
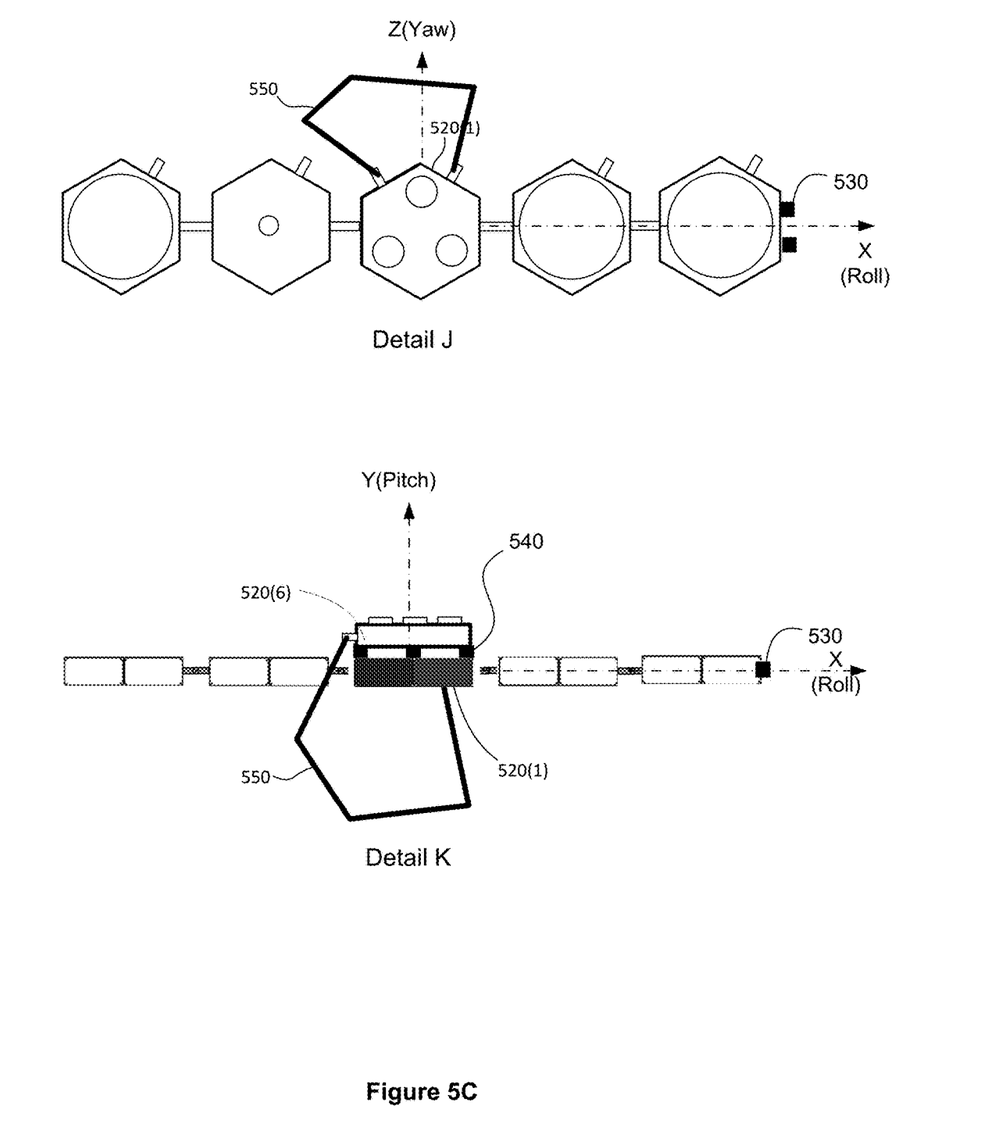
Figure 5D:
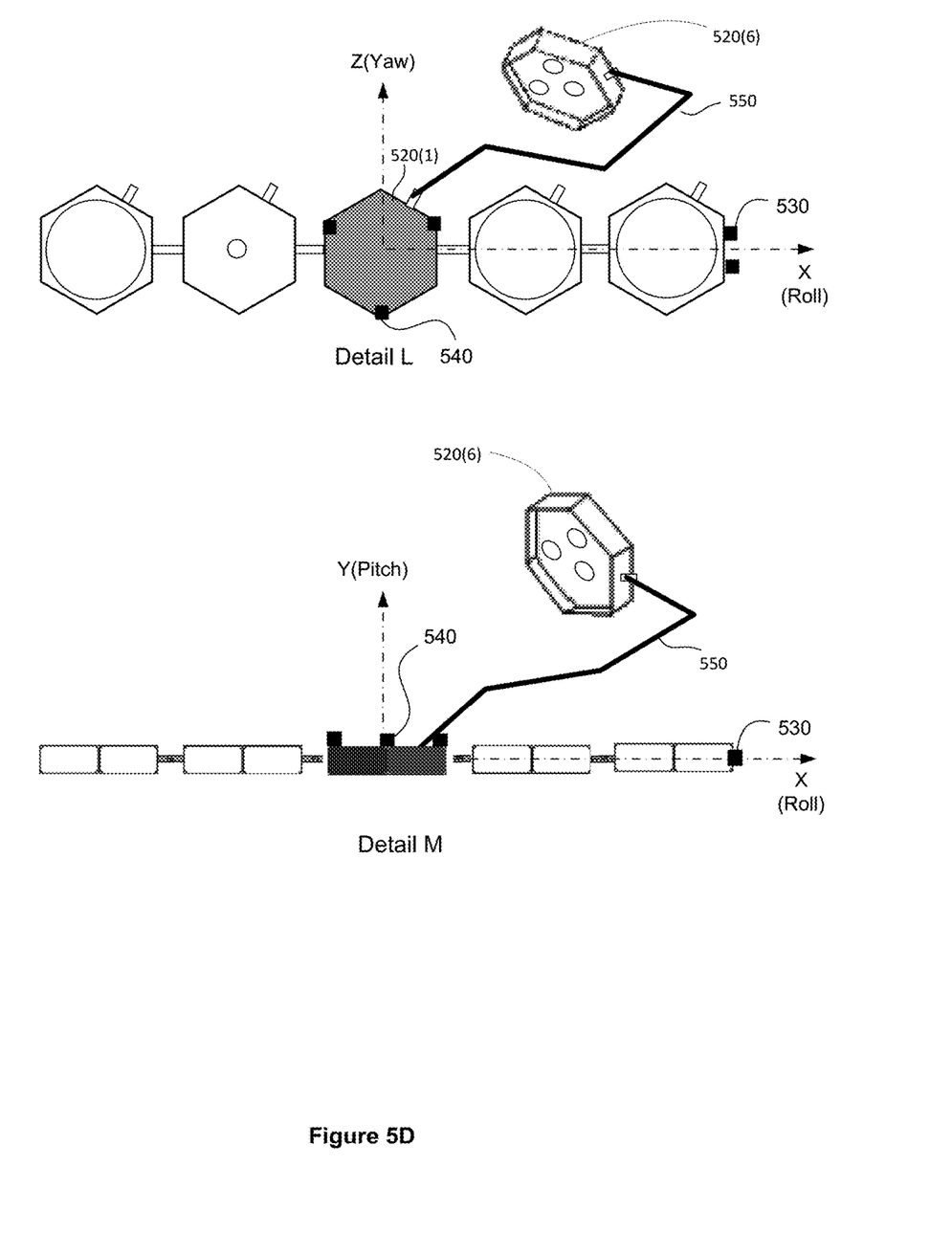

FIGS. 5B through 5D illustrate techniques by which the spacecraft 500 may be reconfigured from the first on-orbit configuration to the second on-orbit configuration. Details G and H of FIG. 5B depict, respectively, a view directed along the Y (pitch) axis and Z (yaw) axis of the spacecraft 500 in the first on-orbit configuration (solar arrays omitted for clarity of illustration). A first arrangement 530 couples a deployable propulsion module 520(6) with the remainder of the spacecraft. A manipulator 550 is operable to detach the propulsion module 520(6) from the arrangement 530.

Details J and K of FIG. 5C depict, respectively, a view directed along the Y axis and the Z axis of the spacecraft 500 in the second on-orbit configuration (solar arrays omitted for clarity of illustration). A second arrangement 540 couples the deployable propulsion module 520(6) with the remainder of the spacecraft. More particularly, the second arrangement 540 couples the deployable propulsion module 520(6) with a bus services module 520(1). The manipulator 550 may be operable to attach the propulsion module 520(6) to the arrangement 540.

Referring now to Details L and M of FIG. 5D, a configuration is illustrated that may occur as part of a transition between the first on-orbit configuration and the second on-orbit configuration. In the illustrated "transition configuration" of FIG. 5D, the deployable propulsion module 520(6) is detached from both the first arrangement 530 and the second arrangement 540. In the illustrated configuration, the manipulator 550 is mechanically coupled at a first end with bus services module 520(1). A distal portion of the manipulator 550 may include a second end effector that is detachably engaged with the deployable propulsion module 520(6).

Figure 6:
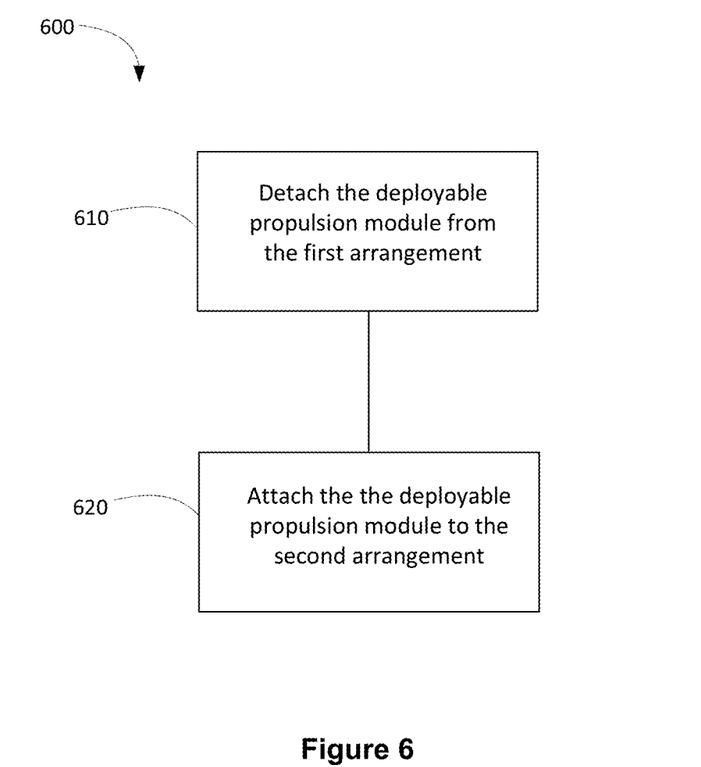
FIG. 6 illustrates a process flow diagram for an orbiting spacecraft from a first configuration to a second configuration, according to an implementation.

FIG. 6 illustrates a process flow diagram for an orbiting spacecraft from a first configuration to a second configuration. As described hereinabove the spacecraft may include includes a deployable propulsion module, a first arrangement for coupling the propulsion module to a first potion of the spacecraft in the first configuration and a second arrangement for coupling the propulsion module to a second portion of the spacecraft in the second configuration. In the first configuration, the deployable propulsion module is detached from the second arrangement and the at least one thruster is oriented to produce thrust in a first direction. In the second configuration, the deployable propulsion module is detached from the first arrangement and the at least one thruster is oriented to produce thrust in a second direction, the second direction being substantially different from the first direction. The method 600 may start, at block 610 with detaching the deployable propulsion module from the first arrangement. The method 600 may finish, at block 620, with attaching the first deployable element to the second arrangement. The attaching and detaching steps may be accomplished with a manipulator, for example, a self-relocatable robotic arm that may also be configured to reposition the deployable propulsion module between a first location proximate to the first arrangement and a second location proximate to the second arrangement.

Thus, improved techniques for robotically assisted assembly and reconfiguration of a spacecraft including a deployable propulsion module have been described. The foregoing merely illustrates principles of the invention. It will thus be appreciated that those skilled in the art will be able to devise numerous systems and methods which, although not explic-

What is claimed is:

1. A spacecraft comprising:
at least one deployable propulsion module, the propulsion module including at least one thruster fixedly disposed with respect to the propulsion module; wherein:
the spacecraft includes a first arrangement for coupling the propulsion module to a first portion of the spacecraft in a first configuration and a second arrangement for coupling the propulsion module to a second portion of the spacecraft in a second configuration;
the spacecraft is reconfigurable, on-orbit, from the first configuration to the second configuration;
in the first configuration, the deployable propulsion module is detached from the second arrangement and the at least one thruster is oriented to produce thrust in a first direction; and
in the second configuration, the deployable propulsion module is detached from the first arrangement and the at least one thruster is oriented to produce thrust in a second direction, the second direction being substantially different from the first direction.

2. The spacecraft of claim 1, wherein:
in a transition configuration, intermediate to the first configuration and the second configuration, the deployable propulsion module is detached from both the first arrangement and the second arrangement.

3. The spacecraft of claim 1, wherein:
the spacecraft includes a solar array rotatable about a solar array rotational axis;
the first direction is approximately orthogonal to the solar array rotational axis; and
the second direction has a substantial component parallel to the solar array rotational axis.

4. The spacecraft of claim 1, wherein the spacecraft includes a plurality of deployable module elements, the spacecraft being reconfigurable from a launch configuration to either of the first configuration and second configuration, wherein:
in the launch configuration, the deployable module elements are disposed in a launch vehicle in a stacked configuration; and
in the first configuration and second configuration, the deployable module elements are disposed in a side by side configuration.

5. The spacecraft of claim 1, wherein at least one of the first arrangement and the second arrangement includes an electrical coupling between the deployable propulsion module and one or both of the first portion of the spacecraft and the second portion of the spacecraft.

6. The spacecraft of claim 2 wherein, in the transition configuration, the deployable propulsion module is coupled with the spacecraft only by way of a mechanical linkage, the mechanical linkage including a manipulator.

7. The spacecraft of claim 6, wherein the manipulator is a self-relocatable robotic arm, the robotic arm including at least two end effectors, and a plurality of articulable joints disposed between the at least two end effectors.

8. The spacecraft of claim 6, wherein the manipulator is operable to reconfigure the spacecraft from the first configuration, through the transition configuration, to the second configuration.

9. The spacecraft of claim 4, wherein at least one of the deployable module elements is a persistent bus services module and at least one of the deployable module elements is a replaceable payload module.

10. A method comprising:
reconfiguring an orbiting spacecraft from a first configuration to a second configuration, wherein
the spacecraft includes a deployable propulsion module including at least one thruster, a first arrangement for coupling the propulsion module to a first potion of the spacecraft in the first configuration and a second arrangement for coupling the propulsion module to a second portion of the spacecraft in the second configuration;
in the first configuration, the deployable propulsion module is detached from the second arrangement and the at least one thruster is oriented to produce thrust in a first direction;
in the second configuration, the deployable propulsion module is detached from the first arrangement and the at least one thruster is oriented to produce thrust in a second direction, the second direction being substantially different from the first direction; and
reconfiguring the orbiting spacecraft includes:
detaching the deployable propulsion module from the first arrangement; and
attaching the deployable propulsion module to the second arrangement.

11. The method of claim 10, wherein:
in a transition configuration, intermediate to the first configuration and the second configuration, the deployable propulsion module is detached from both the first arrangement and the second arrangement.

12. The method of claim 10, wherein:
the spacecraft includes a solar array rotatable about a solar array rotational axis;
the first direction is approximately orthogonal to the solar array rotational axis; and
the second direction has a substantial component parallel to the solar array rotational axis.

13. The method of claim 10, wherein the spacecraft includes a plurality of deployable module elements, the spacecraft being reconfigurable from a launch configuration to either of the first configuration and second configuration, wherein:
in the launch configuration, the deployable module elements are disposed in a launch vehicle in a stacked configuration; and
in the first configuration and second configuration, the deployable module elements are disposed in a side by side configuration.

14. The method of claim 10, wherein at least one of the first arrangement and the second arrangement includes an electrical coupling between the main body module and the deployable propulsion module.

15. The method of claim 11, wherein in the transition configuration, the deployable propulsion module is coupled with the spacecraft only by way of a mechanical linkage, the mechanical linkage including a manipulator.

16. The method of claim 15, wherein the manipulator is a self-relocatable robotic arm, the robotic arm including at least two end effectors, and a plurality of articulable joints disposed between the at least two end effectors.

17. The method of claim 15, wherein the manipulator is operable to reconfigure the spacecraft from the first configuration, through the transition configuration, to the second configuration.

18. The method of claim 13, wherein at least one of the deployable module elements is a persistent bus services module and at least one of the deployable module elements is a replaceable payload module.

* * * * *